US009148243B2

(12) United States Patent
Walid

(10) Patent No.: US 9,148,243 B2
(45) Date of Patent: Sep. 29, 2015

(54) ALLOCATING UPSTREAM BANDWIDTH IN AN OPTICAL COMMUNICATION NETWORK

(75) Inventor: Anwar I. Walid, Watchung, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1234 days.

(21) Appl. No.: 11/931,472

(22) Filed: Oct. 31, 2007

(65) Prior Publication Data
US 2009/0110392 A1    Apr. 30, 2009

(51) Int. Cl.
H04J 3/16    (2006.01)
H04Q 11/00    (2006.01)

(52) U.S. Cl.
CPC .......... *H04J 3/1694* (2013.01); *H04Q 11/0067* (2013.01)

(58) Field of Classification Search
USPC .......................................... 398/58, 63, 70–72
See application file for complete search history.

(56) References Cited

U.S. PATENT DOCUMENTS

| 2003/0043741 | A1* | 3/2003 | Mukai et al. | 370/229 |
| 2006/0233197 | A1* | 10/2006 | Elmoalem et al. | 370/468 |
| 2006/0268704 | A1* | 11/2006 | Ansari et al. | 370/230 |

OTHER PUBLICATIONS

International Telecommunication Union, "G-PON," ITU-T—The Leader on G-PON Standards, Oct. 2003, 2 pages.

* cited by examiner

*Primary Examiner* — Nathan Curs
(74) *Attorney, Agent, or Firm* — Ryan, Mason & Lewis, LLP

(57) ABSTRACT

A gigabit passive optical network or other type of optical communication network comprises an optical line terminator that transmits data in a downstream direction to multiple optical network units. The optical network units transmit data in an upstream direction to the optical line terminator. In one aspect of the invention, the optical line terminator is operative to allocate upstream bandwidth among the optical network units, to measure usage of the allocated upstream bandwidth by the optical network units, to process the measured usage to determine a predicted variation in usage of upstream bandwidth by the optical network units, and to alter the allocation of the upstream bandwidth based on the predicted variation.

22 Claims, 2 Drawing Sheets

300

ALLOCATING UPSTREAM BANDWIDTH IN AN OPTICAL COMMUNICATION NETWORK

FIELD OF THE INVENTION

The present invention relates generally to communication networks, and more particularly to upstream bandwidth allocation techniques for use in such networks.

BACKGROUND OF THE INVENTION

Conventional optical communication networks include, for example, gigabit passive optical networks (GPONs). The characteristics of exemplary GPONs are described in ITU-T Recommendations G.984.1, G.984.2 and G.984.3, which are incorporated by reference herein. In a typical GPON system, an optical line terminator (OLT) associated with a central office communicates with multiple optical network units (ONUs) corresponding to respective customers. In such a system, data may be transmitted at various data rates up to 2.5 Gigabits per second (Gbps) in a downstream direction, from the central office to the customers, and in an upstream direction, from the customers to the central office. A given system may be symmetrical or asymmetrical in terms of the particular data rates used in the respective downstream and upstream directions, that is, the overall downstream and upstream data rates may be same or different. GPONs provide an efficient mechanism for provision of high-bandwidth services in a local loop. Such services may include, for example, streaming video, Internet access, IP television (IPTV) and IP telephony.

SUMMARY OF THE INVENTION

We have recognized that a problem with conventional GPONs relates to the scheduling of bandwidth for upstream data transmission from the ONUs. The available bandwidth is typically shared among multiple customers, for example, 64 or 128 customers. Thus, each customer may have only a very limited bandwidth available for upstream transmission. Known techniques for allocating upstream bandwidth among the customers generally involve centralized allocation performed by the OLT based on status reports sent by the ONUs. Unfortunately, configuring the ONUs to generate such status reports significantly increases the cost and complexity of the ONUs. On the other hand, using inexpensive ONUs without the capability to generate status reports undermines the allocation process and can result in an unfair or inadequate distribution of the available bandwidth among the customers.

Accordingly, a need exists for an improved approach to upstream bandwidth allocation in a GPON or other type of optical communication network.

The present invention in one or more of the illustrative embodiments provides techniques for predictive dynamic bandwidth allocation, which can determine appropriate allocations of upstream bandwidth in a GPON without requiring status reports from the ONUs.

In one aspect of the invention, techniques are provided for allocating upstream bandwidth in an optical communication network in which data is transmitted in a downstream direction from an OLT to multiple ONUs and in an upstream direction from the multiple ONUs to the optical line terminator. The OLT is configured to allocate upstream bandwidth among the ONUs, to measure usage of the allocated upstream bandwidth by the ONUs, to process the measured usage to determine a predicted variation in usage of upstream bandwidth by the ONUs, and to alter the allocation of the upstream bandwidth based on the predicted variation.

The predicted variation in usage of upstream bandwidth may comprise, for example, an estimated gradient of bandwidth usage as a function of allocated upstream bandwidth. A portion of the estimated gradient associated with a given one of the optical network units may be determined as a derivative of a sample function for that optical network unit, where the sample function characterizes buffer content levels for the given optical network unit at respective points in time.

A stochastic approximation based on the estimated gradient may be used to determine a new bandwidth allocation that reduces buffer delay in one or more of the optical network units. For example, a new bandwidth allocation may be determined by minimizing or otherwise reducing a specified objective function which is based on expected buffer content levels in respective ones of the optical network units. More particularly, an objective function comprising a sum of average expected buffer content levels across the buffers may be minimized or otherwise reduced. Other types of objective functions may also or alternatively be used.

The particular manner in which bandwidth usage is measured may vary from embodiment to embodiment. For example, such measurements may be obtained by observing sample paths of bandwidth usage, or by monitoring indications of predicted future upstream bandwidth needs of the optical network units.

The illustrative embodiments advantageously facilitate the dynamic allocation of available upstream bandwidth in a GPON. These embodiments do not require status reports from the ONUs, and thus can be implemented using inexpensive ONUs which do not have status report generating capabilities.

DETAILED DESCRIPTION OF THE INVENTION

The invention will be illustrated herein in conjunction with illustrative embodiments of communication networks and associated dynamic bandwidth allocation techniques. It should be understood, however, that the invention is not limited to use with the particular networks and techniques described, but is instead more generally applicable to any network bandwidth allocation application in which it is desirable to avoid the need for status reports or other similar communications from end user equipment.

Figure 1:
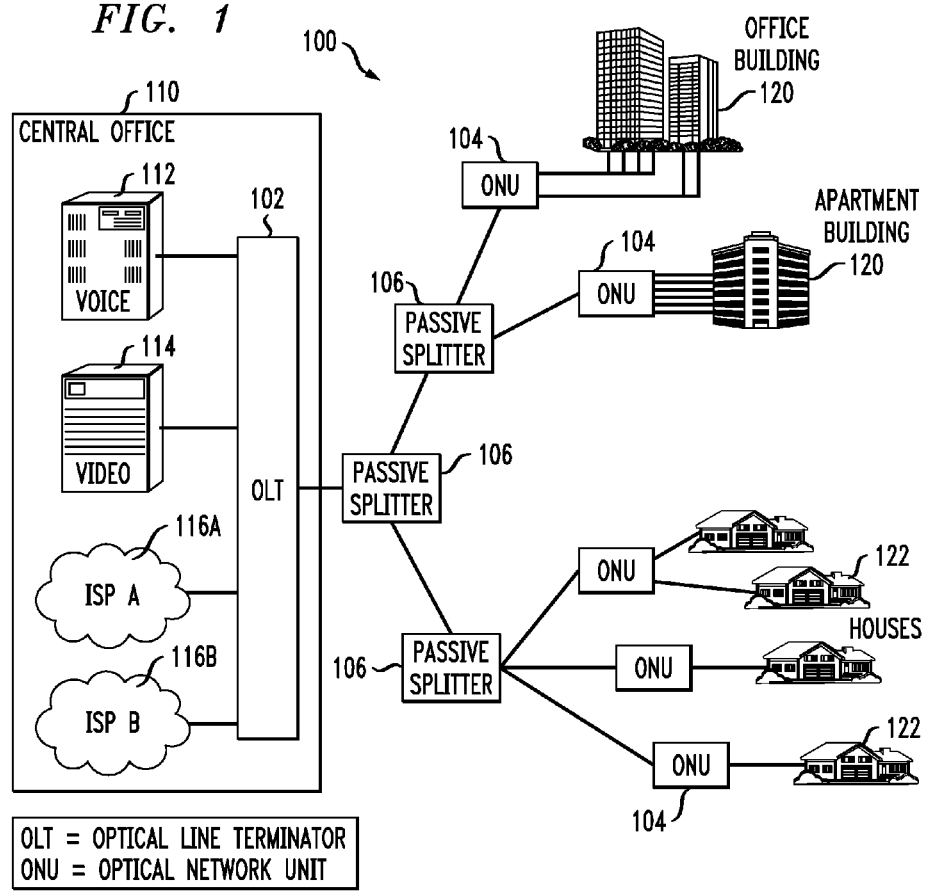
FIG. 1 shows an illustrative embodiment of a communication network in accordance with the invention.

FIG. 1 shows an illustrative embodiment of a communication network in the form of a GPON 100 comprising an OLT 102 and multiple ONUs 104. The OLT is coupled to the ONUs via optical elements comprising splitters 106. The splitters 106 may comprise, for example, passive optical intensity or wavelength splitters, or other types of optical signal distribution elements, in any combination. The OLT in this embodiment is associated with a central office 110 that includes voice switching equipment 112, video server equipment 114, and Internet access equipment 116A and 116B associated with respective Internet service providers (ISPs) A and B. Certain of the ONUs are associated with building customers 120, while others are associated with residential customers 122.

The OLT 102 in central office 102 is utilized to transmit data in a downstream direction from the central office to the ONUs 104. Typically, downstream data is broadcast by the OLT to all of the ONUs, and the individual ones of the ONUs identify their respective portions of the downstream data and ignore the rest. Data may also be transmitted in an upstream direction in the network 100, that is, from the ONUs to the OLT. The upstream transmission may involve, for example, time division multiplexing of data from the various ONUs based on corresponding bandwidth and/or time slot grants issued by the OLT.

Although only a single OLT is shown in the FIG. 1 embodiment, a given network may include multiple such elements, each communicating with a corresponding set of ONUs. Each OLT may be associated with a separate central office, or a given central office may include multiple OLTs.

The terms OLT and ONU as used herein are intended to be construed broadly, so as to encompass, for example, not only the corresponding elements as described in the above-noted ITU-T Recommendations G.984.1, G.984.2 and G.984.3 or other passive optical network standards, but more generally other types of optical communication equipment that may be associated with respective system provider and end user elements of an optical communication network. For example, an ONU as the term is used herein may serve one customer or multiple customers, and thus is intended to encompass devices commonly referred to as optical network terminals (ONTs), which are typically located on a customer premises and serve a single customer.

It is also to be appreciated that the present invention does not require a central office 110 or particular types of end user facilities 120, 122. Other types of service provider equipment and end user facilities may be utilized in implementing the invention. The central office 110 may thus be viewed as one example of what is more generally referred to herein as service provider equipment.

The service provider equipment in a given embodiment may include a wide variety of additional or alternative elements utilizable to deliver data to customers or other users via a communication network. Such elements may include, for example, servers, switches, routers, controllers, signal combiners, databases or other storage devices, or other typical service provider equipment elements, in any combination. As indicated above, such service provider equipment may be utilized to connect a data network to one or more customers via an OLT and one or more ONUs of a GPON.

The illustrative embodiment may be utilized, for example, in providing IPTV services via GPON 100 to customers associated with the ONUs 104. However, the disclosed predictive dynamic bandwidth allocation techniques can be adapted in a straightforward manner for use in scheduling upstream bandwidth in other types of communication networks and in other service applications. These other networks may include, for example, cable or satellite networks, and other services may include streaming video, Internet access, IP telephony, etc.

Figure 2:
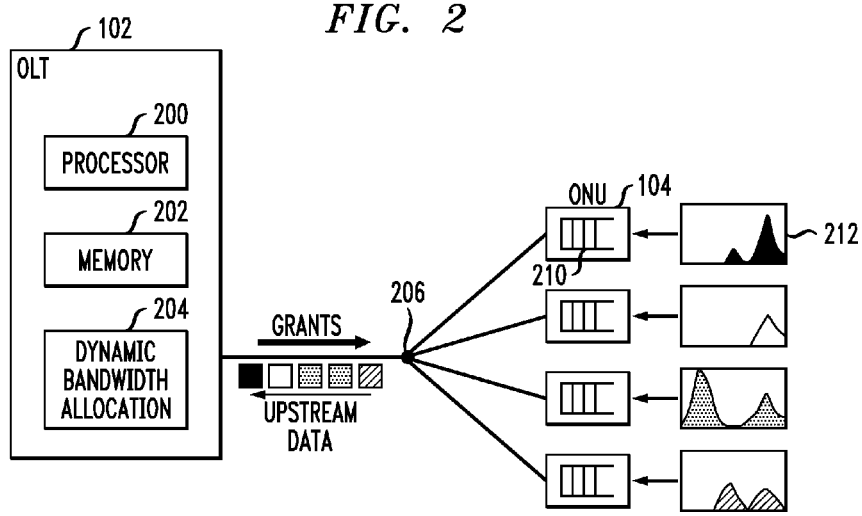
FIG. 2 is a more detailed view of a portion of the FIG. 1 network showing interaction between an OLT and multiple ONUs in an exemplary predictive dynamic bandwidth allocation technique of the present invention.

Referring now to FIG. 2, a more detailed view of a portion of the network 100 is shown. In this embodiment, the OLT comprises a processor 200, a memory 202, and a dynamic bandwidth allocation (DBA) element 204. As will be described in greater detail below, the DBA element of the OLT provides predictive and dynamic allocation of an available upstream bandwidth among the ONUs 104. This is accomplished in the present illustrative embodiment by the DBA element determining an initial allocation of the available upstream bandwidth, measuring usage of the allocated upstream bandwidth by the particular ONUs to which that bandwidth has been allocated, processing the measured usage to determine an estimated gradient or other predicted variation in usage of upstream bandwidth by the ONUs, and altering the bandwidth allocation based on the estimated gradient or other predicted variation. For this embodiment, portions of the estimated gradient associated with respective ONUs are determined as respective derivatives of sample functions of the bandwidth usage. The sample functions may be obtained based on measurement of buffer content levels for the respective ONUs at designated sample points in time. Other types of predicted variations in bandwidth usage may be used in alternative embodiments.

For purposes of illustration, four ONUs are shown in FIG. 2, each being coupled to the OLT via an optical signal distribution element 206, which may comprise, for example, one or more of the splitters 106. Each of the ONUs in this embodiment includes a buffer 210.

It should be noted that it is possible that only a subset of the ONUs 104 may be allocated a portion of the available upstream bandwidth. Thus, certain of the ONUs may not be allocated any of the available upstream bandwidth, and such ONUs need not be part of the usage measurement, gradient determination, and allocation alteration operations performed by the DBA element 204 of the OLT 102. The particular ONUs that are allocated a portion of the available upstream bandwidth may change periodically. The usage measurement, gradient determination and allocation alteration operations may be repeated as appropriate to accommodate such changes in the subset.

The OLT 102 will also include additional elements not explicitly shown in the figure, such as transmitter and receiver circuitry or other interface circuitry of a conventional type, for supporting communication with the ONUs 104 and other network elements such as elements 112, 114 and 16.

The DBA element 204 may be implemented as a separate hardware element within the OLT 102, or may be implemented at least in part in the form of executable software that is stored in memory 202 and executed by processor 200. Other suitable arrangements of hardware, firmware or software may be used to implement the DBA element.

In the FIG. 2 embodiment, it is assumed that the ONUs 104 are not required to transmit status reports to the OLT 102. Thus, the ONUs may be inexpensive units which do not have status report generating capabilities. The DBA element 204 of the OLT is configured to perform predictive dynamic allocation of upstream bandwidth in a manner that avoids the need for the ONUs to transmit status reports. This is an advantage of the present embodiment, in that it may enable the system to have reduced cost and complexity. Other embodiments of the invention may make use of ONU status reports, for example, reports which are transmitted infrequently and which indicate predicted future upstream bandwidth needs of the ONUs. Such reports may be considerably simplified relative to status reports used in conventional GPON systems, and thus these other embodiments can also provide a desirable reduction in system cost and complexity. Moreover, indications of predicted future upstream bandwidth needs can be transmitted using alternative signaling arrangements, rather than via status reports.

The DBA element 204 communicates its upstream bandwidth allocation decisions to the ONUs 104 by sending out upstream bandwidth assignments, which will be referred to as grants. Such grants may, for example, identify particular upstream timeslots to be used by the ONUs to transmit upstream data. The ONUs transmit upstream data as indicated in FIG. 2, based on the grants provided thereto by the DBA element. Each of the ONUs is shown in FIG. 2 as illustratively comprising a single buffer 210, although such ONUs may each include multiple buffers, for example, one buffer for each of a plurality of different quality of service (QoS) types. The buffers 210 are used to store upstream data in respective ones of the ONUs prior to transmission of that upstream data to the OLT 102.

Also associated with each of the ONUs 104 is a corresponding upstream bandwidth usage pattern 212 that reflects the manner in which the corresponding ONU generates upstream data as a function of time. The bandwidth usage patterns are illustratively shown as respective graphs of the amount of upstream data traffic generated (y-axis) as a function of time (x-axis) by the corresponding ONUs. Each of the four graphs has a different shading, and the same shading is used to denote which portions of the upstream data transmitted between element 206 and the OLT 102 are associated with which of the ONUs. As will be described in greater detail below, in the present embodiment the DBA element 204 of the OLT observes, monitors or otherwise measures at least portions of such bandwidth usage patterns and utilizes the resulting bandwidth usage measurements to adjust upstream bandwidth allocation. The usage patterns 212 may be viewed as showing variations in the content levels of the respective buffers 210 as a function of time.

The particular communication network configuration described in FIGS. 1 and 2 above should be viewed as just one illustrative example of such a network. It is to be understood that the invention can be implemented using other types and configurations of communication networks, using a wide variety of different network components.

Figure 3:
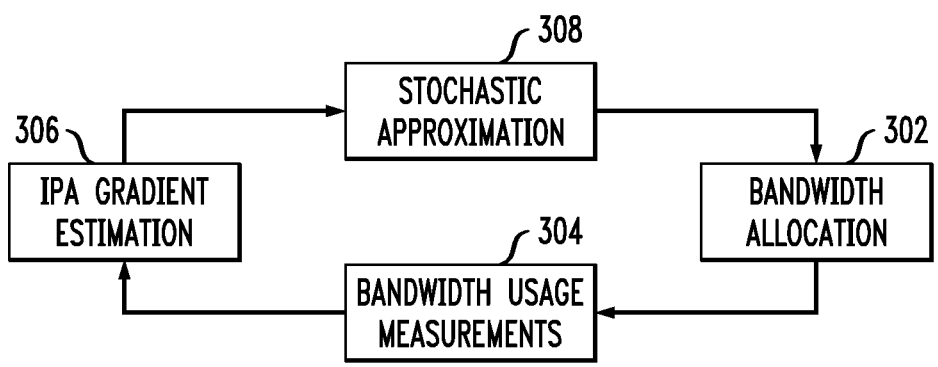
FIG. 3 is a flow diagram showing operations in an exemplary predictive dynamic bandwidth allocation process implemented in the network as shown in FIGS. 1 and 2.

FIG. 3 illustrates the operation of the DBA element 204 in providing predictive and dynamic allocation of upstream bandwidth in the network as shown in FIGS. 1 and 2. The process 300 as shown in the figure includes steps 302, 304, 306 and 308, which are assumed in this embodiment to be performed by the DBA element. These steps may be repeated periodically in the order shown, as needed. For example, repetitions of the steps of the process may be appropriate based on changes in the type and number of ONUs 104 and their associated upstream bandwidth allocations and bandwidth usage patterns.

In step 302, an allocation of the available upstream bandwidth among the ONUs 104 is determined. This allocation may be an initial allocation, in the case of a first iteration of the process 300, or an adjusted bandwidth allocation as obtained after one or more iterations of the process.

In step 304, bandwidth usage measurements are obtained for the individual ONUs 104. The present embodiment may obtain such measurements, for example, by monitoring upstream data transmissions from the ONUs that have been allocated portions of the available bandwidth in step 302. For example, if a given ONU is granted a particular upstream bandwidth assignment, such as a time slot in which to transmit upstream data, but does not transmit any data in that assigned time slot, this fact is noted by the DBA element 204 in step 304. Thus, the observation of an absence of an upstream transmission from a given ONU in a time slot that has been assigned to that ONU as part of the step 302 bandwidth allocation is a type of bandwidth usage measurement that may be obtained by the DBA element. Another example of a bandwidth usage measurement is measuring buffer content levels in the ONUs.

These and other bandwidth usage measurements may more generally involve observing only a sample path of bandwidth usage by the ONUs, that is, sampling the bandwidth usage at one or more designated points in time. Of course, a wide variety of other types of bandwidth usage measurements may be utilized in alternative embodiments of the invention. The terms "measure" and "measurement" as used herein are intended to be broadly construed so as to encompass a wide variety of usage observation or monitoring techniques, including the above-noted sample path observations, as well as the monitoring of reports indicative of future bandwidth needs.

In step 306, a gradient estimation operation is performed. This operation in the present embodiment involves determining an estimated gradient of the bandwidth usage as a function of allocated bandwidth for the ONUs 104. The portion of the gradient determined for a given ONU may be viewed as representative of a sample derivative of the bandwidth usage for that ONU as a function of the allocated bandwidth. The gradient may be estimated, for example, using an approach referred to as infinitesimal perturbation analysis (IPA). As will be described in greater detail below, the IPA approach provides an unbiased estimator that is effective in a dynamic environment, although other estimators may be used.

In step 308, a stochastic approximation approach is applied that utilizes the estimated gradient to iteratively solve an optimization problem involving one or more constrained equations. The solution of the optimization problem as obtained using stochastic approximation is then used to determine a new bandwidth allocation. The process 300 therefore returns to step 302 as indicated in the figure. The allocation of the available upstream bandwidth is adjusted or otherwise altered to reflect the new bandwidth allocation obtained using the output of the stochastic approximation of step 308.

Another advantage of the FIG. 3 process, aside from the fact that it does not require status reports from the ONUs 104, is that it is independent of the particular types of upstream traffic that are being transmitted by the ONUs. Thus, each of the ONUs can transmit upstream traffic in accordance with a different traffic model, and the effectiveness of the allocation adjustment method is not significantly diminished. Also, the bandwidth usage measurements in step 304 can be implemented using efficient hardware implementations of the DBA element 204 if desired.

It is to be appreciated that the process steps shown in FIG. 3 are not requirements of the invention, and alternative embodiments may utilize other operations for performing predictive and dynamic allocation of upstream bandwidth.

As indicated previously, the DBA element 204 that performs the steps of the process 300 of FIG. 3 may be implemented at least in part in the form of hardware. Firmware or software running on processor 200 of the OLT 102 may also or alternatively be utilized in implementing the DBA element.

A more detailed example of the FIG. 3 process will now be described, illustrating one manner in which gradient estimation and stochastic approximation operations of the process may be performed. In this example, it is assumed that the bandwidth allocation in step 302 of the process is determined by solving an optimization problem using a stochastic approximation approach. More particularly, the optimization problem in this embodiment involves minimizing an objective function based on the sum of average expected buffer content levels across the buffers 210 of the ONUs 104, subject to constraints relating to the number of ONUs and the available bandwidth to be allocated among those ONUs. This optimization problem may be formulated as follows:

$$\min_{\theta} J(\theta) = \sum_{i=1}^{N} E[x_i(\theta_i)]$$

$$\sum_{i} \theta_i = C$$

$$\theta_i \geq 0 \; i = 1, \ldots, N$$

where N denotes the number of ONUs over which the bandwidth will be allocated, E denotes the expected value operator, $x_i$ denotes the content level of buffer 210-i within the ith ONU, $\theta_i$ is the bandwidth allocated to the ith ONU having buffer i, $\theta$ is a vector of the $\theta_i$ values, C is the total available bandwidth to be allocated, and $J(\theta)$ is the objective function to be minimized over $\theta$. It should be noted that achievement of an absolute minimum is not required, and instead the process may involve, for example, an approximate minimization based on achievement of a sufficient reduction within a specified processing time or after a particular number of iterations. Also, the particular objective function is merely an example, and numerous other objective functions may be used in alternative embodiments.

As mentioned above, the solution of the above-described optimization problem provides a bandwidth allocation, and may be obtained using the following stochastic approximation:

$$\theta_{k+1} = \Pi_{\theta}(\theta_k - a_k \nabla J(\theta_k)),$$

where $\theta_{k+1}$ is the output of the stochastic approximation for iteration k+1, $\theta_k$ is the output of the stochastic approximation for iteration k, $\Pi_{\theta}$ denotes a projection of values back to a feasible region defined by the constraints of the optimization problem, and $a_k$ is step size parameter of the stochastic approximation. The step size parameter $a_k$ controls the speed of convergence and stability of the stochastic estimation. A value of one is typically used for $a_k$, although in this embodiment values of less than one, and more particularly in the range of about 0.1 to 0.5, may alternatively be used. The element $$\nabla J(\theta_k)$$

in the above stochastic approximation equation is an estimated gradient. The estimated gradient may be obtained using an IPA approach, as will be described below.

In accordance with a typical IPA approach, a sample function for a given one of the buffers 210-i may be formulated as:

$$Q_i(\omega, \theta_i) = \int_0^t x_i(\omega, \theta_i, \tau) d\tau, \; \omega \in \Omega$$

$$J(\theta_i) = E[Q_i(\omega, \theta_i)].$$

In this exemplary sample function, $\omega$ denotes one or more sample points in a sample space given by $\Omega$. Each such sample point may correspond to a point of measured usage, for example, a measured buffer content level for buffer 210-i at a particular point in time. The content level $x_i$ is shown as being a function of the sample points $\omega$, the allocated bandwidth value $\theta_i$ and an integration index $\tau$ over which integration is performed from 0 to t. The sample points $\omega$ may correspond to one or more particular points in time within the interval 0 to t. The corresponding sample derivative $$\frac{d}{d\theta_i} Q_i(\omega, \theta_i)$$

may be used as an estimator of the gradient $$\frac{d}{d\theta_i} J(\theta_i) = \frac{d}{d\theta_i} E[Q_i(\omega, \theta_i)].$$

We have determined that this approach provides an unbiased estimator in the present embodiment. That is, $$E\left[\frac{d}{d\theta_i} Q_i(\omega, \theta_i)\right] = \frac{d}{d\theta_i} E[Q_i(\omega, \theta_i)].$$

The estimated gradient in the stochastic approximation equation given above may be determined by summing the individual gradient estimators determined from the respective sample derivatives for each of the $\theta_i$ values.

Figure 4:
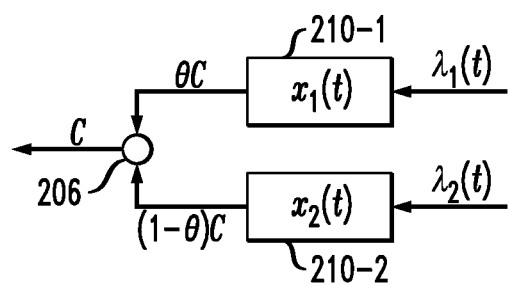
FIG. 4 illustrates a simplified example of a predictive dynamic bandwidth allocation process as applied to allocation across buffers in a pair of ONUs.

FIG. 4 illustrates the application of the above-described IPA gradient estimation approach to a two-buffer example. The two buffers 210-1 and 210-2 in this example are associated with respective first and second ONUs 104 and have respective content levels given by $x_1(t)$ and $x_2(t)$ as a function of time t. The buffers 210-1 and 210-2 receive respective streams of input data traffic $\lambda_1(t)$ and $\lambda_2(t)$ for upstream transmission to the OLT 102. The available bandwidth C in this example is allocated between the two buffers, with the first buffer 210-1 receiving a portion $\theta C$ and the second buffer 210-2 receiving the remaining portion $(1-\theta)C$, where $0 \leq \theta \leq 1$. The sample function for a given one of the buffers in this two-buffer example is given by:

$$Q_i(t, \theta_i) = \frac{1}{t} \int_0^t x_i(\tau; \theta_i) d\tau$$

and the corresponding sample derivative is given by $$\frac{d}{d\theta} Q_i(t, \theta_i) = -\frac{C}{2t} \sum p_b^2$$

where $p_b$ is the duration of a given non-empty period in the corresponding input data traffic, and the summation is over all such non-empty periods between times 0 and t. Such non-empty periods are also referred to as burst periods. The data traffic may be modeled as originating from on-off bursty sources having burst periods that occur in accordance with well-known exponential or Pareto distributions, although the techniques are applicable to any type of traffic distribution. As mentioned above, the FIG. 3 process is advantageously independent of the particular types of upstream traffic that are being transmitted.

The particular stochastic approximation and gradient estimation techniques described in the examples above are intended for purposes of illustration only, and should not be viewed as limiting the scope of the invention in any way. Those skilled in the art will recognize that other techniques may be used to determine allocation of upstream bandwidth among ONUs based on measured usage in a given embodiment of the invention.

The particular embodiments shown in FIGS. 1 and 2 are well suited for use in providing IPTV services to end users. However, as noted previously, the disclosed techniques are adaptable in a straightforward manner for use in other applications, such as streaming video, Internet access, and IP telephony, and to other types of communication networks, such as cable and satellite communication systems.

It should again be emphasized that the above-described embodiments are intended to be illustrative only. For example, the network configuration and predictive upstream bandwidth allocation process can be altered in other embodiments. As another example, the upstream data may comprise any type of information signals, in any combination, including video, voice, control, commands, messages, etc. These and numerous other alternative embodiments within the scope of the following claims will be readily apparent to those skilled in the art.

We claim:

1. A method, comprising the steps of:
    allocating upstream bandwidth among optical network units in an optical communication network in which data is transmitted in a downstream direction from an optical line terminator to the optical network units and in an upstream direction from the optical network units to the optical line terminator;
    measuring usage of the allocated upstream bandwidth by the optical network units;
    processing the measured usage to determine a predicted variation in usage of upstream bandwidth by the optical network units; and
    altering the allocation of the upstream bandwidth based on the predicted variation;
    wherein portions of the predicted variation are associated with respective ones of the optical network units;
    wherein the predicted variation in usage of upstream bandwidth comprises an estimated gradient of bandwidth usage as a function of allocated upstream bandwidth; and
    wherein a portion of the estimated gradient associated with a given one of the optical network units is determined as a derivative of a sample function for that optical network unit.

2. The method of claim 1 wherein the optical communication network comprises a gigabit passive optical network.

3. The method of claim 1 wherein the measuring step includes determining for a given one of the optical network units whether the given unit has transmitted uplink data in a particular portion of the available bandwidth allocated to that unit.

4. The method of claim 3 wherein the particular portion of the available bandwidth allocated to the given unit comprises at least one upstream transmission time slot assigned to the given unit.

5. The method of claim 1 wherein the measuring step comprises sampling buffer content levels for respective ones of the optical network units.

6. The method of claim 1 wherein the sample function characterizes buffer content levels for the given optical network unit at respective points in time.

7. The method of claim 1 wherein the step of altering the bandwidth allocation further comprises the step of performing a stochastic approximation to determine a new bandwidth allocation that reduces buffer delay in one or more of said optical network units.

8. The method of claim 1 wherein the step of altering the bandwidth allocation further comprises the step of determining a new bandwidth allocation by minimizing or otherwise reducing a specified objective function which is based on expected buffer content levels in respective ones of the optical network units.

9. The method of claim 8 wherein the step of minimizing or otherwise reducing an objective function based on expected content levels of buffers further comprises minimizing or otherwise reducing a sum of average expected buffer content levels across the buffers.

10. The method of claim 1 wherein the step of measuring usage of the allocated upstream bandwidth by the optical network units further comprises monitoring indications of predicted future upstream bandwidth needs of the optical network units.

11. The method of claim 1 wherein said step of processing the measured usage to determine a predicted variation in usage is performed in the optical line terminator of the optical communication network.

12. The method of claim 11 wherein said steps of allocating upstream bandwidth, measuring usage of the allocated upstream bandwidth, processing the measured usage to determine a predicted variation in usage, and altering the allocation of the upstream bandwidth are all performed in the optical line terminator of the optical communication network.

13. A non-transitory machine-readable storage medium having encoded therein machine-executable instructions that when executed implement the steps of:
    allocating upstream bandwidth among optical network units in an optical communication network in which data is transmitted in a downstream direction from an optical line terminator to the optical network units and in an upstream direction from the optical network units to the optical line terminator;
    measuring usage of the allocated upstream bandwidth by the optical network units;
    processing the measured usage to determine a predicted variation in usage of upstream bandwidth by the optical network units; and
    altering the allocation of the upstream bandwidth based on the predicted variation;
    wherein portions of the predicted variation are associated with respective ones of the optical network units;
    wherein the predicted variation in usage of upstream bandwidth comprises an estimated gradient of bandwidth usage as a function of allocated upstream bandwidth; and
    wherein a portion of the estimated gradient associated with a given one of the optical network units is determined as a derivative of a sample function for that optical network unit.

14. The machine-readable storage medium of claim 13 wherein the sample function characterizes buffer content levels for the given optical network unit at respective points in time.

15. The machine-readable storage medium of claim 13 wherein altering the bandwidth allocation further comprises performing a stochastic approximation to determine a new bandwidth allocation that reduces buffer delay in one or more of said optical network units.

16. The machine-readable storage medium of claim 13 wherein altering the bandwidth allocation further comprises determining a new bandwidth allocation by minimizing or otherwise reducing a specified objective function which is based on expected buffer content levels in respective ones of the optical network units.

17. The machine-readable storage medium of claim 16 wherein minimizing or otherwise reducing an objective function based on expected content levels of buffers further comprises minimizing or otherwise reducing a sum of average expected buffer content levels across the buffers.

18. An apparatus comprising:
an optical line terminator configured to transmit data in a downstream direction to multiple optical network units and to receive data in an upstream direction from the multiple optical network units;
said optical line terminator comprising a bandwidth allocation element operative to allocate upstream bandwidth among the optical network units, to measure usage of the allocated upstream bandwidth by the optical network units, to process the measured usage to determine a predicted variation in usage of upstream bandwidth by the optical network units, and to alter the allocation of the upstream bandwidth based on the predicted variation;
wherein portions of the predicted variation are associated with respective ones of the optical network units;
wherein the predicted variation in usage of upstream bandwidth comprises an estimated gradient of bandwidth usage as a function of allocated upstream bandwidth; and
wherein a portion of the estimated gradient associated with a given one of the optical network units is determined as a derivative of a sample function for that optical network unit.

19. The apparatus of claim 18 wherein a new bandwidth allocation is determined by minimizing or otherwise reducing a specified objective function which is based on expected buffer content levels in respective ones of the optical network units.

20. An optical communication network comprising:
an optical line terminator; and
a plurality of optical network units coupled to the optical line terminator;
wherein data is transmitted in a downstream direction from the optical line terminator to the optical network units and in an upstream direction from the optical network units to the optical line terminator;
wherein said optical line terminator is operative to allocate upstream bandwidth among the optical network units, to measure usage of the allocated upstream bandwidth by the optical network units, to process the measured usage to determine a predicted variation in usage of upstream bandwidth by the optical network units, and to alter the allocation of the upstream bandwidth based on the predicted variation;
wherein portions of the predicted variation are associated with respective ones of the optical network units;
wherein the predicted variation in usage of upstream bandwidth comprises an estimated gradient of bandwidth usage as a function of allocated upstream bandwidth; and
wherein a portion of the estimated gradient associated with a given one of the optical network units is determined as a derivative of a sample function for that optical network unit.

21. The optical communication network of claim 20 wherein the optical line terminator measures usage of the allocated upstream bandwidth by the optical network units by sampling buffer content levels for respective ones of the optical network units.

22. The optical communication network of claim 20 wherein the optical line terminator measures usage of the allocated upstream bandwidth by the optical network units by monitoring indications of predicted future upstream bandwidth needs of the optical network units.

* * * * *